United States Patent  
Chen et al.

(10) Patent No.: US 9,283,846 B2
(45) Date of Patent: Mar. 15, 2016

(54) VEHICULAR WARNING SYSTEM AND METHOD

(75) Inventors: Chun-Hsiung Chen, Lugong (TW); Chan-Wei Hsu, Lugong (TW); Ming-Kuan Ko, Lugong (TW)

(73) Assignee: Automotive Research & Testing Center (TW)

( * ) Notice: Subject to any disclaimer, the term of this patent is extended or adjusted under 35 U.S.C. 154(b) by 1117 days.

(21) Appl. No.: 13/336,020

(22) Filed: Dec. 23, 2011

(65) Prior Publication Data

US 2013/0162791 A1    Jun. 27, 2013

(51) Int. Cl.
*H04N 7/18*        (2006.01)
*B60K 28/06*      (2006.01)

(52) U.S. Cl.
CPC .......... *B60K 28/066* (2013.01); *B60W 2420/42* (2013.01); *B60W 2540/26* (2013.01)

(58) Field of Classification Search
CPC .......... B60K 28/066; B60W 2420/42; B60W 2540/26
See application file for complete search history.

(56) References Cited

U.S. PATENT DOCUMENTS

| | | | |
|---|---|---|---|
| 2006/0131093 A1* | 6/2006 | Egami | 180/272 |
| 2008/0059054 A1* | 3/2008 | Yamada | 701/200 |
| 2009/0037088 A1* | 2/2009 | Taguchi | 701/117 |
| 2012/0081544 A1* | 4/2012 | Wee | 348/140 |
| 2012/0166229 A1* | 6/2012 | Collins et al. | 705/4 |
| 2012/0212353 A1* | 8/2012 | Fung et al. | 340/905 |

\* cited by examiner

*Primary Examiner* — Nhon Diep
(74) *Attorney, Agent, or Firm* — Schwegman Lundberg & Woessner, P.A.

(57) ABSTRACT

A vehicular warning system includes an image information generating module for generating image information associated with a driver and a position of a vehicle, an operation information generating module for generating operation information associated with operation of the vehicle, and a processing module determining first and second risk values respectively with reference to the image information and the operation information, determining a risk index with reference to the first and second risk values, and generating an alert-triggering signal to be received by an alert module that generates an alert signal of one of sound, light and pictures in response to the alert-triggering signal when the risk index reaches a predetermined index threshold.

5 Claims, 5 Drawing Sheets

VEHICULAR WARNING SYSTEM AND METHOD

BACKGROUND OF THE INVENTION

1. Field of the Invention

This invention relates to a warning system and a warning method, more particularly to a vehicular warning system and a vehicular warning method.

2. Description of the Related Art

A conventional vehicular warning system for use with a vehicle comprises a driver surveillance module for capturing images of a driver of the vehicle, and a processing module electrically connected to the driver surveillance module for determining, based on the captured images, a duration of shutting of an eye of the driver or changes in position of the driver's head so as to identify whether the driver is dozing off or distracted. However, the abovementioned system is apt to misjudge when the driver moves.

Another conventional vehicular warning system for use with a vehicle comprises an operation information generating module for generating operation information associated with operation of the vehicle, including, for instance, a lateral acceleration and a steering angle of the vehicle, and a processing module electrically connected to the operation information generating module for establishing a transfer function according to the operation information received therefrom so as to determine a state of a driver of the vehicle, e.g., whether the driver is dozing off. However, false determinations may arise if abrupt changes occur in the driver's driving behavior, such as when the driver makes a sudden change of lanes. Additionally, computational complexity of such warning system involving transfer functions is relatively high.

SUMMARY OF THE INVENTION

Therefore, an object of the present invention is to provide a vehicular warning system and a vehicular warning method capable of alleviating the above drawbacks of the prior art.

According to an aspect of this invention, a vehicular warning system comprises an image information generating module, an operation information generating module, a processing module, and an alert module. The image information generating module is for generating image information associated with at least one of a driver of a vehicle and a position of the vehicle. The operation information generating module is for generating operation information associated with operation of the vehicle. The processing module is electrically connected to the image information generating module and the operation information generating module for respectively receiving the image information and the operation information therefrom. The processing module determines a first risk value with reference to the image information, determines a second risk value with reference to the operation information, further determines a risk index indicative of a degree of risk with reference to the first and second risk values, and generates an alert-triggering signal when the risk index reaches a predetermined index threshold. The alert module is electrically connected to the processing module for receiving the alert-triggering signal therefrom, and generates an alert signal of one of sound, light and pictures in response to the alert-triggering signal.

According to another aspect of this invention, the vehicular warning method comprises the steps of:

a) configuring a processor to obtain image information associated with at least one of a driver of a vehicle and a position of the vehicle;

b) configuring the processor to obtain operation information associated with operation of the vehicle;

c) configuring the processor to determine a first risk value with reference to the image information and to determine a second risk value with reference to the operation information;

d) configuring the processor to determine a risk index indicative of a degree of risk with reference to the first and second risk values; and e) configuring the processor to enable an alert to warn the driver of potential danger when it is determined that the risk index reaches a predetermined index threshold.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
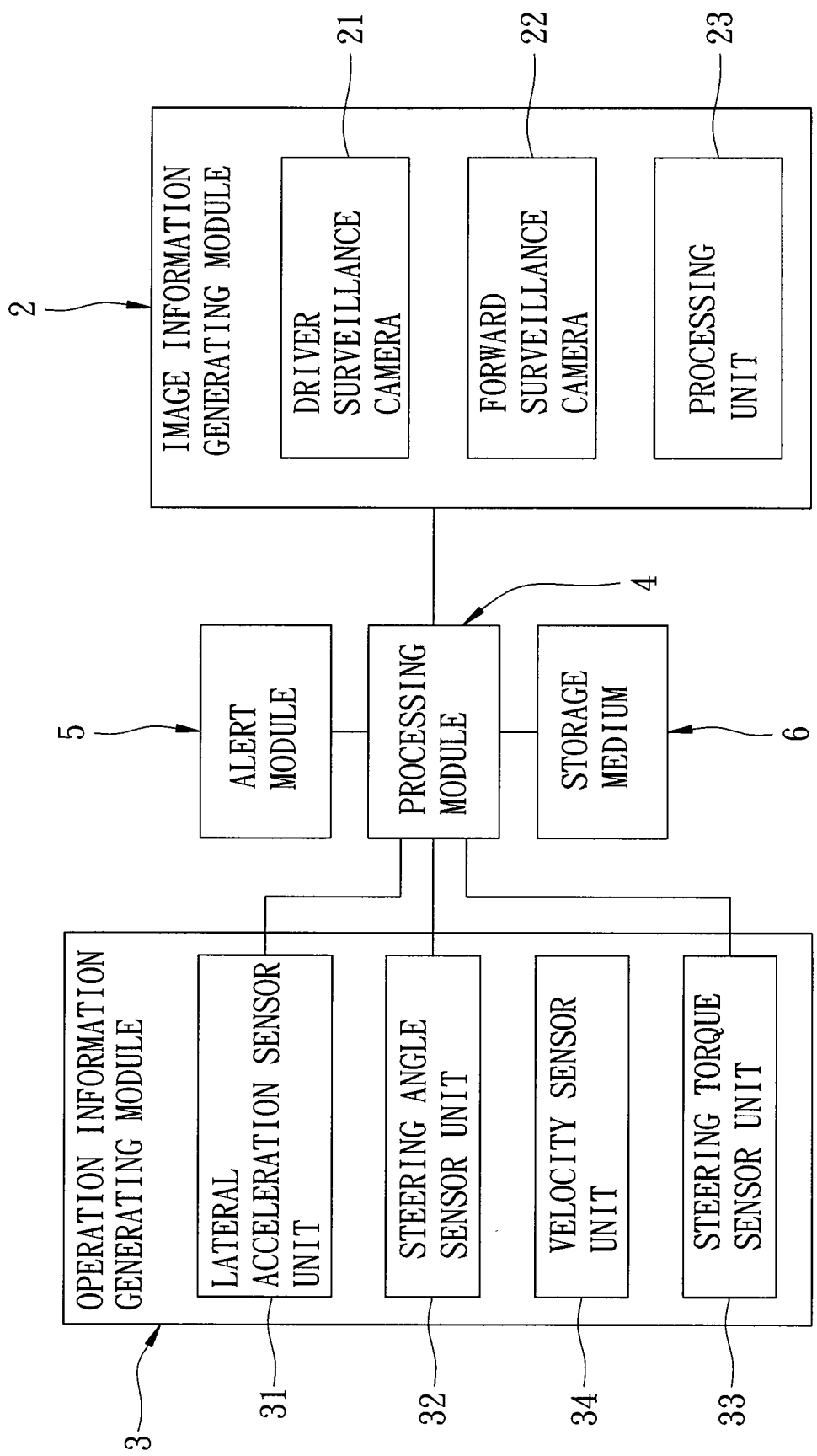
FIG. 1 is a block diagram of a preferred embodiment of the vehicular warning system according to the present invention.
Figure 2:
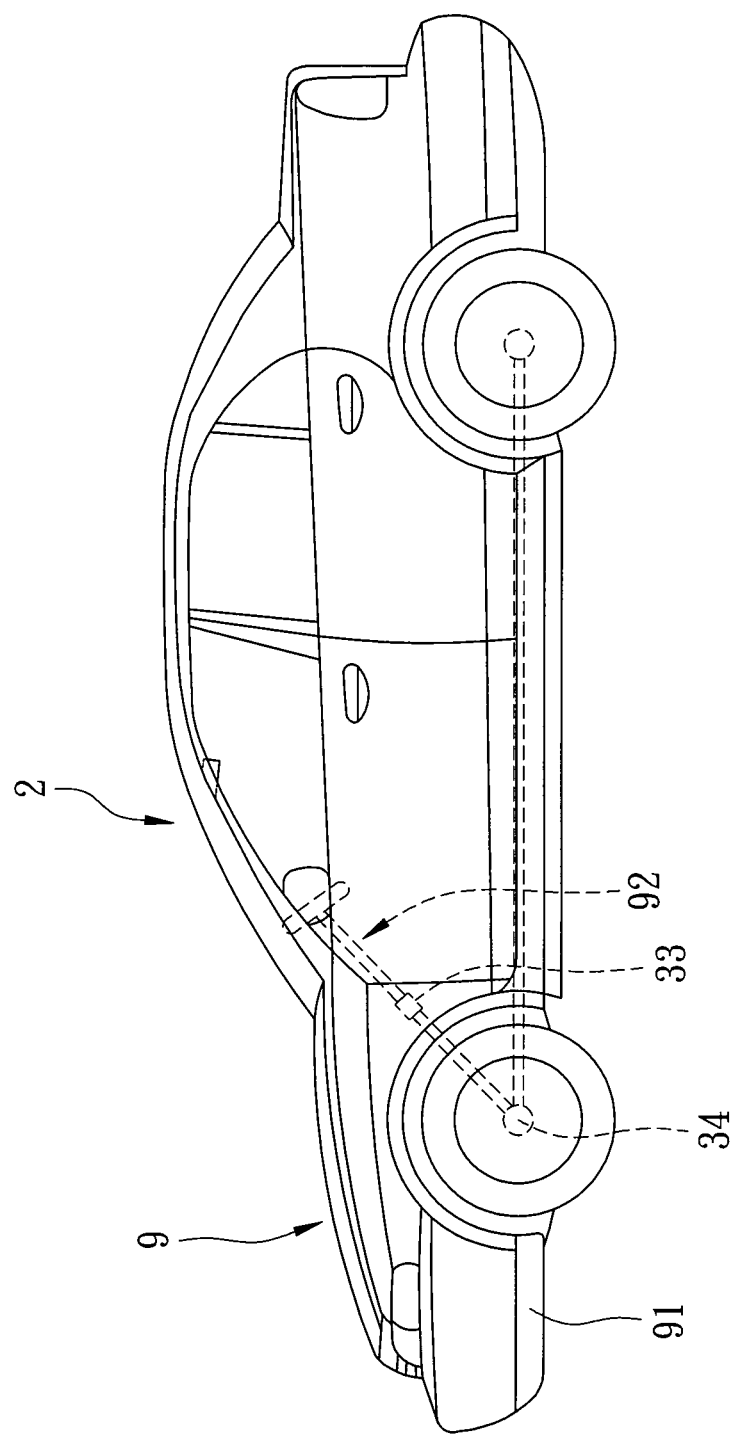
FIG. 2 is a schematic view of a vehicle installed with the vehicular warning system.

Referring to FIGS. 1 and 2, the preferred embodiment of a vehicular warning system for use with a vehicle 9 according to the present invention comprises an image information generating module 2, an operation information generating module 3, a processing module 4, and an alert module 5. The vehicle 9 includes a vehicle body 91 and a handling module 92.

The image information generating module 2 generates image information associated with at least one of a driver (not shown) of the vehicle 9 and a position of the vehicle 9. The image information generating module 2 includes a driver surveillance camera 21 for monitoring the driver of the vehicle 9, a forward surveillance camera 22 for monitoring a view ahead of the vehicle 9, and a processing unit 23 coupled electrically to the driver surveillance camera 21 and the forward surveillance camera 22 and generating the image information based on monitoring results of the driver surveillance camera 21 and the forward surveillance camera 22. The processing unit 23 determines from the monitoring result of the driver surveillance camera 21 a dozing degree indicative of whether shutting of an eye of the driver continues for a predetermined duration, and further determines from the monitoring result of the forward surveillance camera 22 a lane departure degree indicative of a position of the vehicle 9 within a current lane and a front barrier degree indicative of a position of the vehicle 9 relative to a barrier ahead of the vehicle 9. The image information is composed of at least one of the dozing degree, the lane departure degree and the front barrier degree.

The operation information generating module 3 generates operation information associated with operation of the vehicle 9. The operation information generating module 3 includes a lateral acceleration sensor unit 31, a steering angle sensor unit 32, and a steering torque sensor unit 33. The lateral acceleration sensor unit 31 is to be mounted on the vehicle body 91 of the vehicle 9 for detecting a lateral acceleration of the vehicle body 91, the steering angle sensor unit 32 is to be mounted on the vehicle body 91 for detecting a steering angle of the vehicle body 91, and the steering torque sensor unit 33 is to be mounted on the handling module 92 for detecting a steering torque of the handling module 92. The operation information generated by the operation information generating module 3 is composed of the lateral acceleration of the vehicle body 91, the steering angle of the vehicle body 91 and the steering torque of the handling module 92. In this embodiment, the operation information generating module 3 further includes a velocity sensor unit 34 to be mounted on the vehicle body 91 for detecting a velocity of the vehicle body 91, which also forms a part of the operation information herein.

In an implementation, the lateral acceleration sensor unit 31 may be capable of detecting a lateral acceleration of the vehicle body 91 and generate an output in the form of a voltage, the steering angle sensor unit 32 may be capable of detecting a steering angle of the vehicle body 91 and generate an output in the form of a voltage, and the steering torque sensor unit 33 may be capable of detecting a steering torque of the handling module 92 and generate an output in the form of a voltage.

The processing module 4 is electrically connected to the image information generating module 2 and the operation information generating module 3 for respectively receiving the image information and the operation information therefrom. The processing module 4 determines a first risk value with reference to the image information, further determines a second risk value with reference to the operation information, and further determines a risk index indicative of a degree of risk with reference to the first and second risk values. The processing module 4 generates an alert-triggering signal when the risk index reaches a predetermined index threshold.

In this embodiment, the processing module 4 determines the first risk value by giving each of the dozing degree, the lane departure degree, and the front barrier degree a respective predetermined weight parameter, and taking a maximum of the weighted dozing degree, the weighted lane departure degree, and the weighted front barrier degree. The processing module 4 determines the second risk value by performing fuzzification and defuzzification on the lateral acceleration, the steering angle, the steering torque and the velocity with reference to a predetermined set of membership functions (shown in FIGS. 4(a)~4(e)) and a predetermined set of fuzzy rules (shown in Table 1) that are stored in a storage medium 6. It is noted that, in this embodiment, the fuzzification is performed using triangular and trapezoidal fuzzifiers, and the defuzzification is performed according to the weighted average defuzzification technique. The processing module 4 determines the risk index by combining the first risk value multiplied by a first predetermined weight and the second risk value multiplied by a second predetermined weight, and generates the alert-triggering signal when the risk index reaches a predetermined index threshold. Details related to the determination of the first and second risk values, as well as of the risk index, will become apparent in later descriptions with reference to a specific example.

The alert module 5 is electrically connected to the processing module 4 for receiving the alert-triggering signal therefrom, and generates an alert signal of one of sound, light and pictures in response to the alert-triggering signal. In this embodiment, the alert module 5 is a buzzer.

Figure 3:
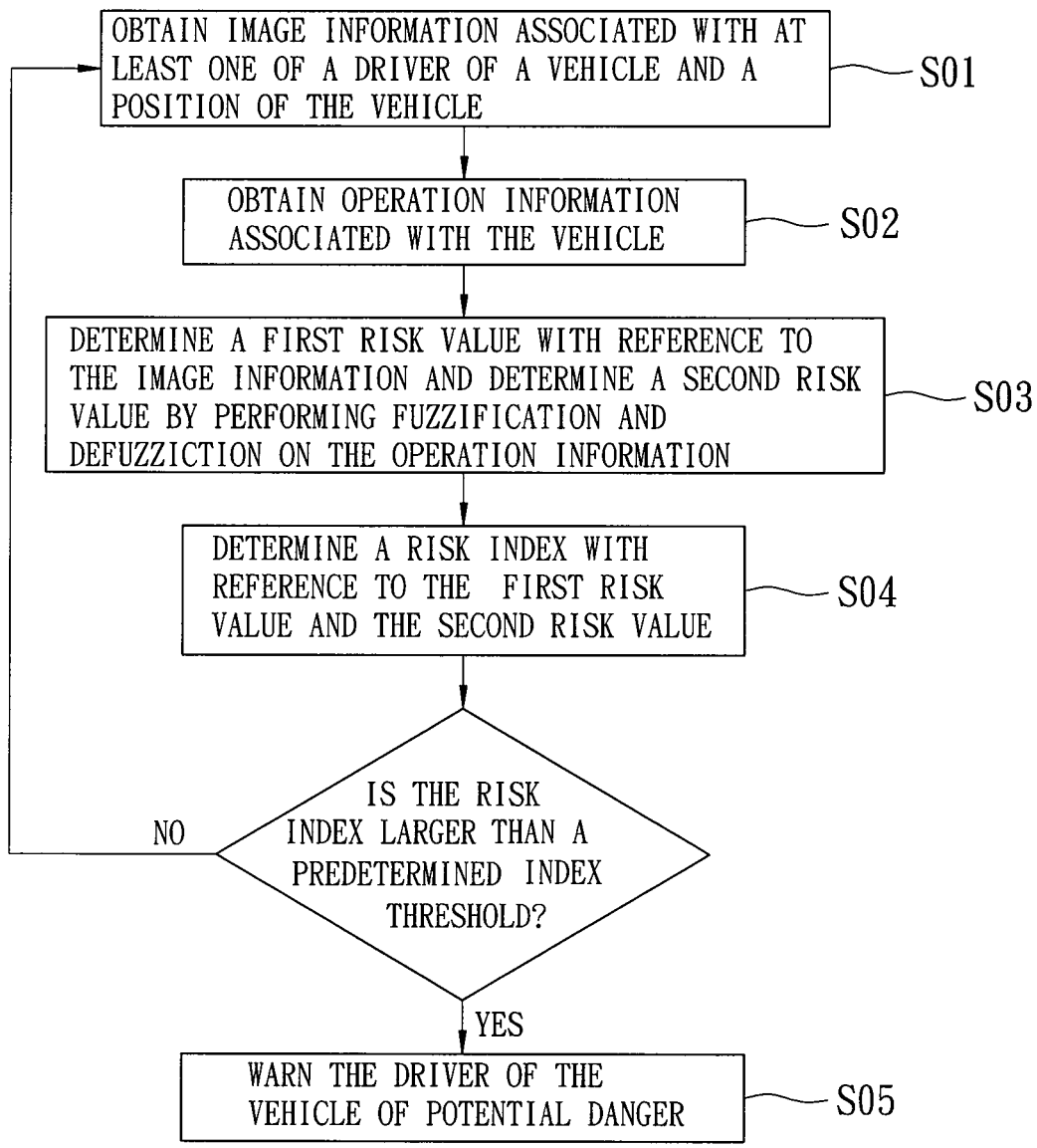
FIG. 3 is a flow chart of a preferred embodiment of the vehicular warning method according to the present invention.
Figure 4A:
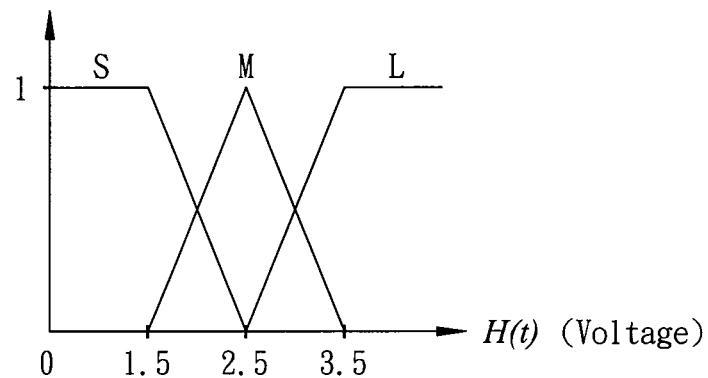
FIGS. 4 (*a*) to 4 (*e*) are five diagrams respectively illustrating membership functions used in step S03 of the vehicular warning method.
Figure 4B:
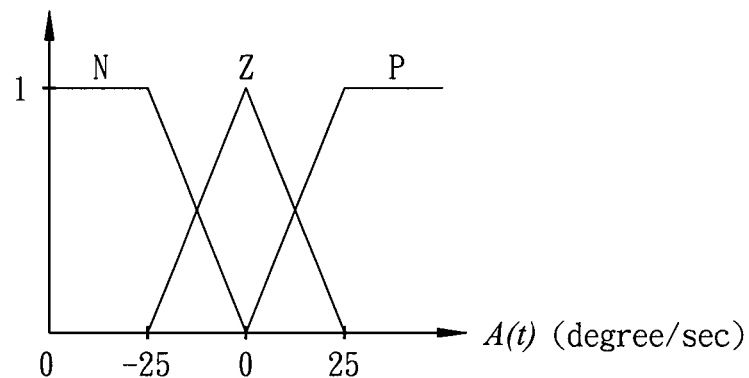
Figure 4C:
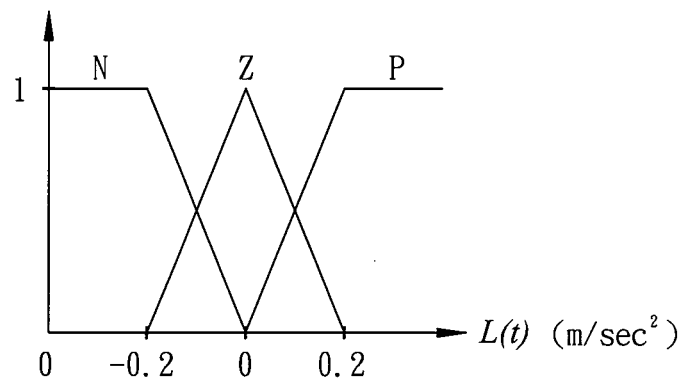
Figure 4D:
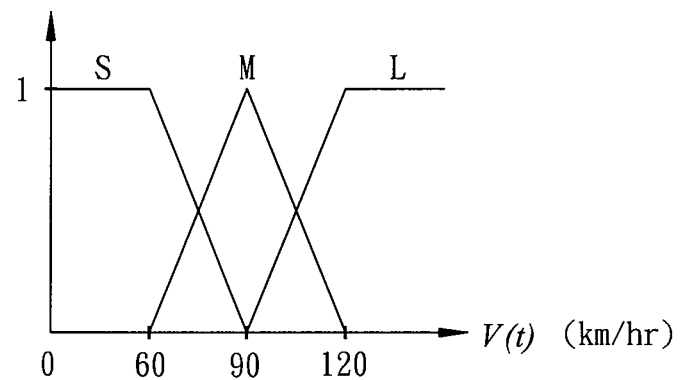
Figure 4E:
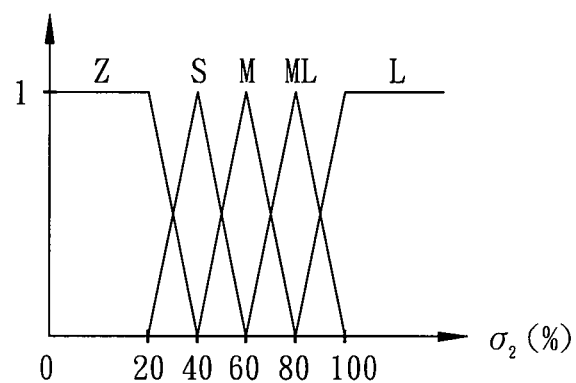

Referring to FIG. 3, the vehicular warning system is configured to implement a vehicular warning method according to the present invention. The preferred embodiment of the vehicular warning method of the present invention includes the following steps. In step S01, a processor is configured to obtain image information associated with at least one of a driver of a vehicle 9 (shown in FIG. 2) and a position of the vehicle 9. The image information is derived from monitoring results of the driver and of a view ahead of the vehicle 9, and is composed of at least one of a dozing degree indicative of whether shutting of an eye of the driver continues for a predetermined duration, a lane departure degree indicative of a position of the vehicle 9 within a current lane, and a front barrier degree indicative of a position of the vehicle 9 relative to a barrier ahead of the vehicle 9. It should be noted herein that since the derivation of the dozing degree, the lane departure degree and the front barrier degree from the monitoring results of the driver surveillance camera 21 and the front surveillance camera 22 is not where the feature of the present invention resides, and can be carried out in various ways, details of the same are omitted herein.

In step S02, the processor is configured to obtain operation information associated with operation of the vehicle 9. The operation information is composed of a lateral acceleration L(t) of the vehicle body 91, a steering angle A(t) of the vehicle body 91 and a steering torque H(t) of the handling module 92. As discussed above, the operation information of this embodiment further consists of a velocity V(t) of the vehicle body 91.

In this embodiment, steps S01 and S02 are performed substantially simultaneously.

In step S03, the processor is configured to determine a first risk value with reference to the image information. In this embodiment, the first risk value is determined by giving each of the dozing degree, the lane departure degree, and the front barrier degree a respective predetermined weight parameter, and taking a maximum of the weighted dozing degree, the weighted lane departure degree, and the weighted front barrier degree.

Specifically, the first risk value is defined according to the following equation.

$$\sigma_1(t) = \max\left( P_L \frac{K_L(t)}{\max\_K_L}, P_F \frac{\max\_K_F - K_F(t)}{\max\_K_F}, P_D K_D(t) \right) \quad (1)$$

In Equation (1), $\sigma_1(t)$ represents the first risk value at time t, $K_L(t)$ denotes the lane departure degree at time t in the form of a distance indicative of the position of the vehicle 9 within the current lane in this embodiment, the distance being the greater of a distance between a left side of the vehicle 9 (say, represented by the left front wheel) and an edge of a current lane in a corresponding side and a distance between a right side of the vehicle 9 (say, represented by the right front wheel) and an edge of the current lane in a corresponding side, $K_F(t)$ denotes the front barrier degree at time t in the form of a distance indicative of the position of the vehicle 9 relative to a barrier ahead of the vehicle 9 in this embodiment, the distance being a distance between the front side of the vehicle 9 (say, a front bumper of the vehicle 9) and the barrier ahead, $K_D(t)$ denotes the dozing degree at time t and is set to be 1 when shutting of an eye of the driver at time t has continued for the predetermined duration, which is defined as 5 seconds herein, and is set to be 0 otherwise, $\max\_K_L$ denotes a predetermined threshold for the lane departure degree, $\max\_K_F$ denotes a predetermined threshold for the front barrier degree, and $P_L$, $P_F$, $P_D$ denotes three predetermined weight parameters respectively corresponding to the lane departure degree, the front barrier degree and the dozing degree. Herein, max_$K_L$ is in the form of a predetermined distance between a side of the vehicle 9 and an edge of a standard-sized lane in a corresponding side when the vehicle 9 is centered in the standard-sized lane, and is defined to be 100 cm since the standard-sized lane is approximately 4 m in width and a standard-sized vehicle is approximately 2 m in width, and max_$K_F$ is in the form of a predetermined distance that varies with the velocity of the vehicle 9 and is a standard distance to be kept between the vehicle 9 and another vehicle ahead so as to keep safety. For instance, if the velocity of the vehicle 9 is 80 km/hr, max_$K_F$ is set as 40 m. In addition, $P_L$, $P_F$, $P_D$ may be predetermined based on experimental data, and are respectively defined as 1, 1, and 0.8 herein.

For example, when the lane departure degree $K_L(t)$ is equal to 50 cm, the front barrier degree $K_F(t)$ is equal to 10 m, the dozing degree $K_D(t)$ is 1, and the velocity V(t) is 80 km/hr, the first risk value is determined to be 0.8 by Equation (1) as follows while max_$K_F$ is set based on the velocity V(t).

$$\sigma_1(t) = \max\left(1 \times \frac{50}{100}, 1 \times \frac{40-10}{40}, 0.8 \times 1\right) = 0.8$$

In step S03, the processor is further configured to determine a second risk value by performing fuzzification and defuzzification on the lateral acceleration L(t), the steering angle A(t), the steering torque H(t) and the velocity V(t) with reference to a predetermined set of membership functions (see FIGS. 4 (a) to 4 (e)) and a predetermined set of fuzzy rules (see Table 1). The fuzzification is performed using triangular and trapezoidal fuzzifiers, and the defuzzification is performed according to the weighted average defuzzification technique. It is noted that, prior to implementation of the vehicular warning method, the predetermined set of membership functions and the predetermined set of fuzzy rules may be defined based on experimental results.

In the following, an example of how the processor performs fuzzification and defuzzification will be illustrated. Referring to FIG. 4 (a), when the steering torque H(t) is represented by 2.6 (volt), the processor is configured to perform fuzzification on the steering torque H(t) by mapping the value of 2.6 into the predetermined membership function corresponding to the steering torque H(t) so as to determine a membership degree of the value of 2.6 in each of applicable one(s) of the fuzzifier for the respective predetermined membership function (for the membership function corresponding to the steering torque H(t), there are a total of three fuzzifiers, namely a triangular fuzzifier (M) and trapezoidal fuzzifiers (S,L). The following results are obtained from performing fuzzification on the steering torque H(t)=2.6:

$$M(H(t)) = \frac{h_3 - H(t)}{h_3 - h_2} = \frac{3.5 - 2.6}{3.5 - 2.5} = 0.9$$

$$L(H(t)) = \frac{H(t) - h_3}{h_3 - h_2} = \frac{2.6 - 2.5}{3.5 - 2.5} = 0.1$$

where $h_3$ is the right bound of the triangular fuzzifier (M), and $h_2$ is the center of the triangular fuzzifier (M) and the lower bound of the trapezoidal fuzzifier (L).

Similarly, further referring to FIGS. 4 (b) to 4 (d), when the steering angle A(t) is equal to 20 (degree/sec), the lateral acceleration L(t) is equal to 0.15 (m/sec²), and the velocity V(t) is equal to 80 (km/hr), the processor is configured to perform fuzzification on the steering angle A(t), the lateral acceleration L(t) and the velocity V(t) to determine membership degrees thereof in the triangle and trapezoidal fuzzifiers of the respective predetermined membership functions, when applicable. The following results are obtained from performing fuzzification on the steering angle A(t), the lateral acceleration L(t), and the velocity V(t):

$$Z(A(t)) = \frac{a_3 - A(t)}{a_3 - a_2} = \frac{25 - 20}{25 - 0} = 0.2$$

$$P(A(t)) = \frac{A(t) - a_2}{a_3 - a_2} = \frac{20 - 0}{25 - 0} = 0.8$$

where $a_3$ is the right bound of the triangular fuzzifier (Z), and $a_2$ is the center of the triangular fuzzifier (Z) and the lower bound of the trapezoidal fuzzifier (P);

$$Z(L(t)) = \frac{l_3 - L(t)}{l_3 - l_2} = \frac{0.2 - 0.15}{0.2 - 0} = 0.25$$

$$P(L(t)) = \frac{L(t) - l_2}{l_3 - l_2} = \frac{0.15 - 0}{0.2 - 0} = 0.75$$

where $l_3$ is the right bound of the triangular fuzzifier (Z), and $l_2$ is the center of the triangular fuzzifier (Z) and the lower bound of the trapezoidal fuzzifier (P);

$$S(V(t)) = \frac{v_2 - V(t)}{v_2 - v_1} = \frac{90 - 80}{90 - 60} = 0.33$$

$$M(V(t)) = \frac{V(t) - v_1}{v_2 - v_1} = \frac{80 - 60}{90 - 60} = 0.67$$

where $v_1$ is the left bound of the triangular fuzzifier (M), and $v_2$ is the center of the triangular fuzzifier (M) and the lower bound of the trapezoidal fuzzifier Subsequently, the processor is configured to perform defuzzification on the membership degrees using the weighted average defuzzification technique with reference to the predetermined set of fuzzy rules (see Table 1 below) so as to determine the second risk value.

TABLE 1

| | Fuzzy Rules |
|---|---|
| | FUZZY RULES |
| $R^1$ | If H(t) falls in M, A(t) falls in Z, L(t) falls in Z, and V(t) falls in S, then $\sigma_2$ falls in S |
| $R^2$ | If H(t) falls in L, A(t) falls in Z, L(t) falls in Z, and V(t) falls in S, then $\sigma_2$ falls in Z |
| $R^3$ | If H(t) falls in M, A(t) falls in P, L(t) falls in Z, and V(t) falls in S, then $\sigma_2$ falls in M |
| $R^4$ | If H(t) falls in L, A(t) falls in P, L(t) falls in Z, and V(t) falls in S, then $\sigma_2$ falls in M |
| $R^5$ | If H(t) falls in M, A(t) falls in Z, L(t) falls in P, and V(t) falls in S, then $\sigma_2$ falls in M |
| $R^6$ | If H(t) falls in L, A(t) falls in Z, L(t) falls in P, and V(t) falls in S, then $\sigma_2$ falls in M |
| $R^7$ | If H(t) falls in M, A(t) falls in P, L(t) falls in P, and V(t) falls in S, then $\sigma_2$ falls in L |
| $R^8$ | If H(t) falls in L, A(t) falls in P, L(t) falls in Z, and V(t) falls in S, then $\sigma_2$ falls in M |
| $R^9$ | If H(t) falls in M, A(t) falls in Z, L(t) falls in Z, and V(t) falls in M, then $\sigma_2$ falls in S |
| $R^{10}$ | If H(t) falls in L, A(t) falls in Z, L(t) falls in Z, and V(t) falls in M, then $\sigma_2$ falls in Z |
| $R^{11}$ | If H(t) falls in M, A(t) falls in P, L(t) falls in Z, and V(t) falls in M, then $\sigma_2$ falls in ML |

TABLE 1-continued

Fuzzy Rules

| FUZZY RULES | |
| --- | --- |
| $R^{12}$ | If H(t) falls in L, A(t) falls in P, L(t) falls in Z, and V(t) falls in M, then $\sigma_2$ falls in ML |
| $R^{13}$ | If H(t) falls in M, A(t) falls in Z, L(t) falls in P, and V(t) falls in M, then $\sigma_2$ falls in ML |
| $R^{14}$ | If H(t) falls in L, A(t) falls in Z, L(t) falls in P, and V(t) falls in M, then $\sigma_2$ is M |
| $R^{15}$ | If H(t) falls in M, A(t) falls in P, L(t) falls in P, and V(t) falls in M, then $\sigma_2$ falls in L |
| $R^{16}$ | If H(t) falls in L, A(t) falls in P, L(t) falls in Z, and V(t) falls in M, then $\sigma_2$ falls in M |

First of all, fuzzy intersection operator is applied to the membership degrees for the steering torque H(t), the steering angle A(t), the lateral acceleration L(t) and the velocity V(t) for each of the rules $R^1$ to $R^{16}$, i.e., the minimum value of the membership degrees for H(t)=2.6, A(t)=20, L(t)=0.15, V(t)=80 in this example is taken for each of the rules $R^1$ to $R^{16}$. The results are listed as follows.

$$W_1 = \min\{M(H(t)), Z(S(t)), Z(L(t)), S(V(t))\} = 0.2$$

$$W_2 = \min\{L(H(t)), Z(S(t)), Z(L(t)), S(V(t))\} = 0.1$$

$$W_3 = \min\{M(H(t)), P(S(t)), Z(L(t)), S(V(t))\} = 0.25$$

$$W_4 = \min\{L(H(t)), P(S(t)), Z(L(t)), S(V(t))\} = 0.1$$

$$W_5 = \min\{M(H(t)), Z(S(t)), P(L(t)), S(V(t))\} = 0.2$$

$$W_6 = \min\{L(H(t)), Z(S(t)), P(L(t)), S(V(t))\} = 0.1$$

$$W_7 = \min\{M(H(t)), P(S(t)), P(L(t)), S(V(t))\} = 0.33$$

$$W_8 = \min\{L(H(t)), P(S(t)), Z(L(t)), S(V(t))\} = 0.1$$

$$W_9 = \min\{M(H(t)), Z(S(t)), Z(L(t)), M(V(t))\} = 0.2$$

$$W_{10} = \min\{L(H(t)), Z(S(t)), Z(L(t)), M(V(t))\} = 0.1$$

$$W_{11} = \min\{M(H(t)), P(S(t)), Z(S(t)), M(V(t))\} = 0.25$$

$$W_{12} = \min\{L(H(t)), P(S(t)), Z(L(t)), M(V(t))\} = 0.1$$

$$W_{13} = \min\{M(H(t)), Z(S(t)), P(L(t)), M(V(t))\} = 0.2$$

$$W_{14} = \min\{L(H(t)), Z(S(t)), P(L(t)), M(V(t))\} = 0.1$$

$$W_{15} = \min\{M(H(t)), P(S(t)), P(L(t)), M(V(t))\} = 0.67$$

$$W_{16} = \min\{L(H(t)), P(S(t)), Z(L(t)), M(V(t))\} = 0.1$$

where $W_i$ denotes the output of the fuzzy intersection operator for rule i.

According to the weighted average defuzzification technique, the second risk value is a weighted average of outputs of the rules, and is defined as Equation (2):

$$\sigma_2(t) = \frac{\sum_{i=1}^{16} W_i B_i}{\sum_{i=1}^{16} W_i} \qquad (2)$$

where $\sigma_2(t)$ represents the second risk value at time t, $W_i$ denotes the output of the fuzzy intersection operator for rule i, and $B_i$ represents a weight associated with rule i.

Subsequently, the weight $B_i$ associated with rule i is determined. Referring to Table 1 and FIG. 4 (e), each rule defines a fuzzifier for the second risk value $\sigma_2(t)$, e.g., according to rule $R^1$, $\sigma_2(t)$ falls in the triangular fuzzifier (S) if H(t) corresponds to fuzzifier (M), A(t) corresponds to fuzzifier (Z), L(t) corresponds to fuzzifier (Z) and V(t) corresponds to fuzzifier (S), and the weight $B_i$ for rule i is equal to the value at the center of a triangular fuzzifier (S, M, ML) or the value at a turning point of a trapezoidal fuzzifier (Z, L). Therefore, the weights $B_i$ for a rule under which the second risk value $\sigma_2(t)$ falls in the fuzzifiers (Z, S, M, ML, L) are respectively defined as 20, 40, 60, 80, and 100 in this example. Accordingly, the second risk value $\sigma_2(t)$ in this example is determined to be 0.713 as follows.

$$\sigma_2(t) = \frac{\begin{array}{l}20 \times (0.1 + 0.1) + 40 \times (0.2 + 0.20) + 60 \times \\ (0.25 + 0.1 + 0.2 + 0.1 + 0.1 + 0.1 + 0.1) + 80 \times \\ (0.25 + 0.1 + 0.2) + 100 \times (0.33 + 0.67)\end{array}}{\begin{array}{l}0.2 + 0.1 + 0.25 + 0.1 + 0.2 + \\ 0.1 + 0.33 + 0.1 + 0.2 + 0.1 + \\ 0.25 + 0.1 + 0.2 + 0.1 + 0.7 + 0.1\end{array}}$$

$$= 0.713$$

In step S04, the processor is configured to determine a risk index indicative of a degree of risk with reference to the first risk value and the second risk value by Equation (3) that combines the first risk value at time t multiplied by a first predetermined weight and the second risk value at time t multiplied by a second predetermined weight as follows:

$$S(t) = w_1 \sigma_1(t) + w_2 \sigma_2(t) \qquad (3)$$

where S(t) represents the risk index, and $w_1$ and $w_2$ respectively denote the first predetermined weight and the second predetermined weight.

In this embodiment, the first and second predetermined weights are respectively defined to be 0.7 and 0.3, and may be varied depending on the situation as long as the first and second predetermined weights are in negative correlation. Consequently, the risk index at time t in this example is calculated to be 0.774 as follows.

$$S(t) = 0.7 \times 0.8 + 0.3 \times 0.713 = 0.774$$

In step S05, the processor is configured to enable an alert to warn the driver of potential danger when it is determined that the risk index S(t) reaches a predetermined index threshold.

It is noted herein that the processing module 4 of the vehicular waning system as shown in FIG. 1 can serve as the processor configured in the steps of the vehicular warning method.

To sum up, since the vehicular warning system and method of the present invention take into consideration information related to a state of a driver of a vehicle 9 (i.e., whether the driver is dozing off), to a position of the vehicle 9 in relation to the environment (i.e., whether the vehicle 9 is drifting off a current lane, and whether the vehicle 9 is too close to a barrier ahead), and to an operating state of the vehicle 9 (i.e., the lateral acceleration, the steering angle and the steering torque of the vehicle 9) in determining whether to alert the driver of potential danger, the present invention is able to provide more accurate alerts than the prior art. In addition, by implementing fuzzy logic for the determination of the second risk value, instead of using transfer functions, computation complexity is reduced and the present invention is able to provide alerts in a more effective way.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A vehicular warning system comprising:

an image information generating module for generating image information associated with at least one of a driver of a vehicle and a position of the vehicle;

an operation information generating module for generating operation information associated with operation of the vehicle;

a processing module electrically connected to said image information generating module and said operation information generating module for respectively receiving the image information and the operation information therefrom, said processing module determining a first risk value with reference to the image information, further determining a second risk value with reference to the operation information, further determining a risk index indicative of a degree of risk with reference to the first and second risk values, and generating an alert-triggering signal when the risk index reaches a predetermined index threshold; and an alert module electrically connected to said processing module for receiving the alert-triggering signal therefrom, and generating an alert signal of one of sound, light and pictures in response to the alert-triggering signal, wherein the vehicle includes a vehicle body and a handling module, wherein said operation information generating module includes a lateral acceleration sensor unit to be mounted on the vehicle body for detecting a lateral acceleration of the vehicle body, a steering angle sensor unit to be mounted on the vehicle body for detecting a steering angle of the vehicle body, and a steering torque sensor unit to be mounted on the handling module for detecting a steering torque of the handling module, the operation information being composed of the lateral acceleration of the vehicle body, the steering angle of the vehicle body and the steering torque of the handling module, wherein said processing module determines the second risk value by performing fuzzification and defuzzification on the lateral acceleration of the vehicle body, the steering angle of the vehicle body and the steering torque of the handling module with reference to a predetermined set of membership functions and a predetermined set of fuzzy rules, wherein the fuzzification is performed using triangular and trapezoidal fuzzifiers, and the defuzzification is performed according to the weighted average defuzzification technique.

2. The vehicular warning system as claimed in claim 1, wherein said image information generating module includes a forward surveillance camera for monitoring a view ahead of the vehicle, a driver surveillance camera for monitoring the driver, and a processing unit coupled electrically to said forward surveillance camera and said driver surveillance camera and generating the image information based on monitoring results of said forward surveillance camera and said driver surveillance camera.

3. The vehicular warning system as claimed in claim 2, wherein said processing unit determines from the monitoring result of said driver surveillance camera a dozing degree indicative of whether shutting of an eye of the driver continues for a predetermined duration, and further determines from the monitoring result of said forward surveillance camera at least one of a lane departure degree indicative of a position of the vehicle within a current lane and a front barrier degree indicative of a position of the vehicle relative to a barrier ahead of the vehicle, the image information being composed of at least one of the dozing degree, the lane departure degree and the front barrier degree.

4. The vehicular warning system as claimed in claim 3, wherein said processing module determines the first risk value by giving each of the dozing degree, the lane departure degree and the front barrier degree a respective predetermined weight parameter, and taking a maximum of the weighted dozing degree, the weighted lane departure degree and the weighted front barrier degree.

5. The vehicular warning system as claimed in claim 1, wherein said processing module determines the risk index by combining the first risk value multiplied by a first predetermined weight and the second risk value multiplied by a second predetermined weight.

* * * * *